United States Patent [19]

Sato

[11] 4,043,259
[45] Aug. 23, 1977

[54] APPARATUS FOR CONTINUOUSLY ROLLING UP SHEETS OF BAKED COOKIES

[75] Inventor: Fumio Sato, Zama, Japan

[73] Assignee: Morinaga & Co., Ltd., Japan

[21] Appl. No.: 704,552

[22] Filed: July 12, 1976

[30] Foreign Application Priority Data

July 19, 1975 Japan .................................. 50-88955
May 19, 1976 Japan .................................. 51-58429

[51] Int. Cl.² ............................................ A23L 3/00
[52] U.S. Cl. ...................................... 99/353; 99/373; 99/443 R
[58] Field of Search ................. 99/353, 355, 360, 373, 99/404, 443 R; 242/DIG. 3

[56] References Cited

U.S. PATENT DOCUMENTS

| | | | |
|---|---|---|---|
| 3,132,949 | 5/1964 | Crowe | 99/353 |
| 3,234,869 | 2/1966 | Porambo | 99/353 |
| 3,265,016 | 8/1966 | Cheung | 99/353 |
| 3,570,393 | 3/1971 | Schy | 99/404 |

Primary Examiner—Leonard D. Christian
Attorney, Agent, or Firm—McGlew and Tuttle

[57] ABSTRACT

A device for forming rolled sheet articles, such as cookies, which are rolled after heating, comprises an endless conveyor which has a surface on which the article is placed and which is continuously advanced at a predetermined speed. The article is moved substantially tangent to a periphery of a roll-up roller which is rotatably mounted alongside a portion of the conveyor and is spaced less than the width of the sheet article thickness from the conveyor. The roll-up roller is rotated at a slower speed than the movement advance of the surface and it engages the sheet article or cookie and causes the bending thereof around its surface. A roller board is arranged adjacent the roll-up roller and it includes a stopper which prevents complete rolling of the article around the roll-up roller and instead deflects it forwardly in the feed advance direction of the conveyor. A friction surface is arranged above the conveyor and it is either stationary so that it provides a drag on the periphery of the partially rolled up article so as to complete its rolling during the advancing movement of the conveyor or it is moved in a direction and in an amount to cause a frictional drag on the periphery of the cookie and to continue its rolling and winding movement. For rolling cookies, it is desirable sometimes to feed the cookie either with its heated surface outermost or with its heated surface innermost and the apparatus includes means for directing the desired surface into the inside rolling arc or the outside rolling arc such as by a reversing device for reversing the location of the surface or by a roll-up roller which is arranged below the conveyor feed rather than above it so as to roll it inwardly rather than outwardly.

14 Claims, 12 Drawing Figures

APPARATUS FOR CONTINUOUSLY ROLLING UP SHEETS OF BAKED COOKIES

FIELD AND BACKGROUND OF THE INVENTION

This invention relates in general to a method and apparatus for forming cookies and, in particular to a new and useful method and device for rolling articles, such as sheets of cookies into a roll after they are heated and before they are permitted to cool.

DESCRIPTION OF THE PRIOR ART

At the present time, it is known to roll cookies or other dough-like substances before they are hardened, by using a rolling up spindle system, a rolling up from the outside system, or a manual rolling up system. In a conventional rolling up with a spindle system, a cookie sheet is inserted between a spindle and a rolling up belt and it is rolled around the spindle as the spindle is rotated and after completion of the rolling up, a rolled product is removed from the spindle.

In a conventional rolling up from the outside system, a strip-shaped chain link, which is deformable into various shapes, such as a cylindrical shape, a flat shape, etc., is deformed into the selected shape so as to wrap the sheet of cookies and after completion of the rolling up, it is spread into a flat shape in order to take out the rolled product. Both of the known systems, however, are very complicated in construction and in the method of carrying out the operation and they involve a high failure rate of the rolled products and require a high expenditure for equipment. The manual system is, by its nature, not a very clean operation, and it is hard to automate and difficult to achieve mass production.

SUMMARY OF THE INVENTION

In accordance with the present invention, there is provided an apparatus and a method for continuously rolling up sheets of baked cookies which eliminates the disadvantages of the prior art and requires only a very simple apparatus and can produce uniform rolled cookies in large quantities automatically and continuously and cleanly without damaging the materials in the process.

In accordance with the invention, there is provided an apparatus for continuously rolling up sheets of baked cookies or similar articles, which comprises an endless conveyor which has a surface which is continuously movable for advancing the cookies through a feed path. The surface is moved into proximity with the surface of a continuously rotating roll-up roller. The roll-up roller is rotated at a speed which is slower than the conveyor and it is sufficiently close to the conveyor so that it engages into the material and causes it to wind around its own surface as the material is advanced by the conveyor. The apparatus includes means for interrupting the rolling engagement of the material with the roller so that it becomes deflected away from the roller, and its outer periphery engages against a frictional surface of a rolling up board which is positioned in proximity to the portion of the conveyor which extends away from the roll-up roller. In the preferred arrangement, the cookies are conveyed in a hot, soft state, and the roll-up roller may be arranged above or below the conveyor reach which carries the cookies so as to be in a position to either roll the dough so that the top or heated surface is rolled inwardly, or so that the top or heated surface is rolled outwardly, as desired.

In accordance with the inventive method, an article such as a heated cookie is advanced along a conveyor in a path extending substantially tangential to a wind-up roller and the material is fed at a speed slightly faster than the speed of rotation of the wind-up roller so that the material is picked up by the roller and deflected into an arc. Thereafter, the material is intercepted so that it does not continue to wind around the wind-up roller while the conveyor is continuously moved, and during this latter movement, the outer periphery of the sheet material is engaged and retarded relative to the speed of advance of the remaining portion on the conveyor so that the winding is continued.

A further object of the invention is to provide a device for winding sheets of cookies or similar materials which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
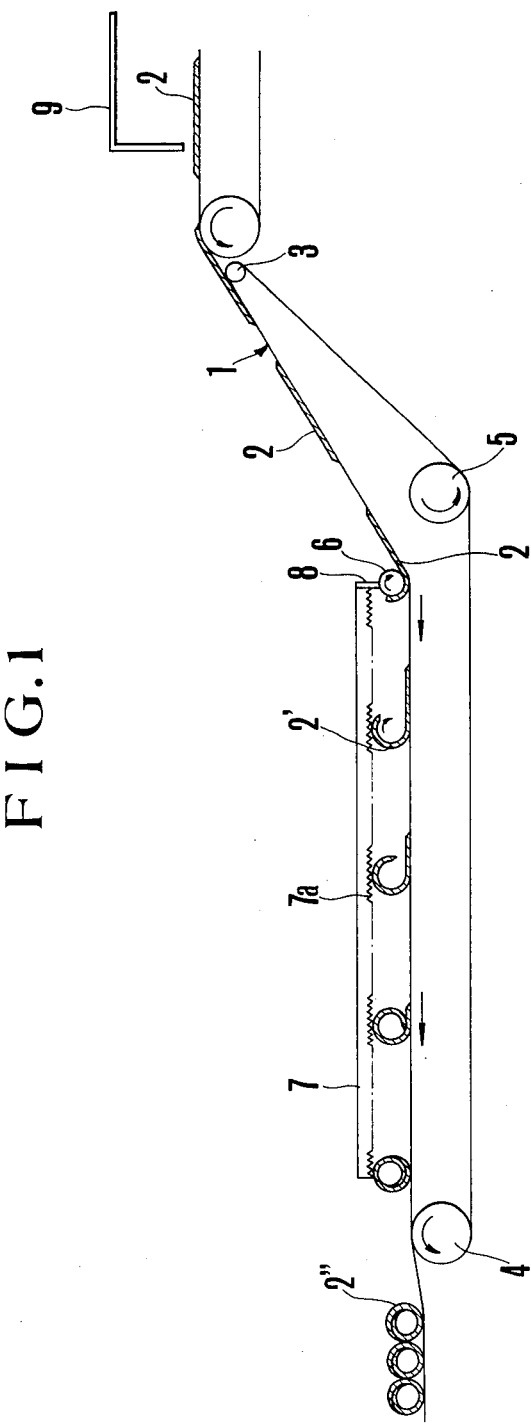
FIG. 1 is a partial side elevational and partial longitudinal schematic sectional view of an apparatus for rolling cookie sheets into a roll after they are heated in an oven, and constructed in accordance with the invention.

Referring to the drawings in particular, the invention embodied therein as indicated in FIGS. 1 through 10 comprises an apparatus for forming sheets of materials, such as cookies 2, which are in a softened state, into a complete rolled form 2''. In accordance with the invention, the cookies are fed over a steel or meshed belt conveyor 31 through an oven 9 and each sheet 2 is dumped in succession onto a moving belt conveyor, generally designated 1, for movement through an operational path. Conveyor 1 includes an endless belt engaged over pulleys 3, 4 and 5 and oriented such that the cookies 2 are fed through a first oblique path extending tangentially toward the surface of a roll-up roller 6 and they are then fed substantially tangentially away from this surface in a second horizontal direction for the completion of the roll-up procedure.

In accordance with a feature of the invention, the belt conveyor 1 is continuously advanced at a predetermined speed, and the roll-up roller is rotated at a speed which is slightly slower than the speed of advance and it is located so as to engage into the surface of the cookie sheet material 2 so as to cause it to bend around its surface to begin the rolling of the cookie to a diameter comparable to the diameter of the roll-up roller 6.

Figure 2:
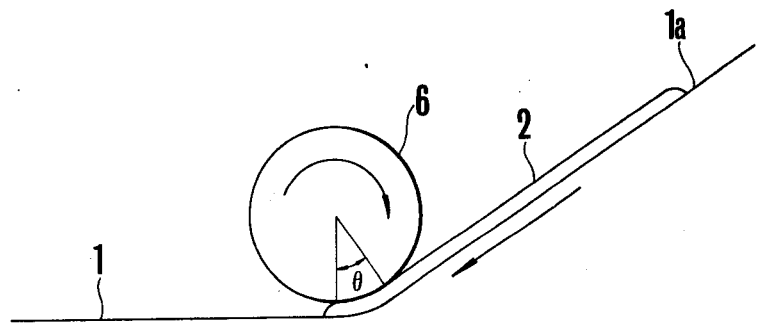
FIG. 2 is a partial enlarged side elevational view of a portion shown in FIG. 1 indicating the initial contact area of the cookie material with the roll-up roller.
Figure 3:
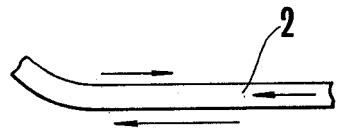
FIG. 3 is a view similar to FIG. 2, but showing only the cookie material.
Figure 4:
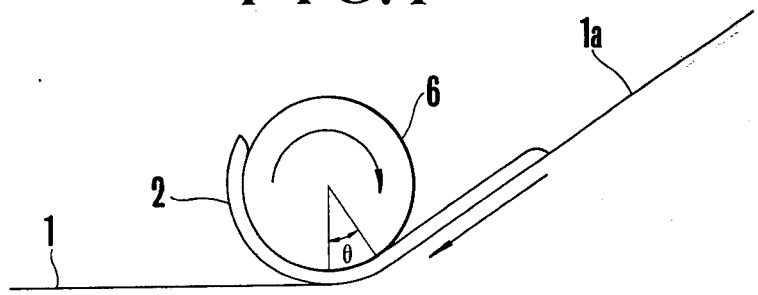
FIG. 4 is a view similar to FIG. 2 showing a more advanced stage of rotation of the roll-up roller.
Figure 5:
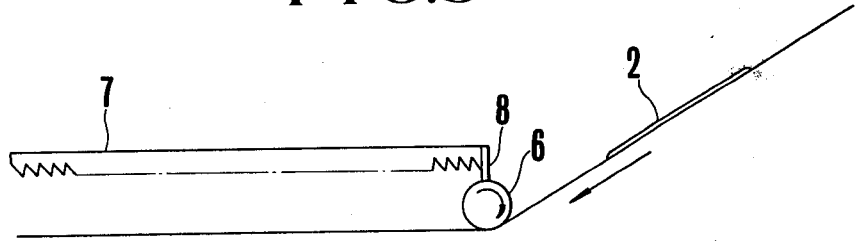
FIG. 5 is a partial elevational view of the apparatus shown in FIG. 1.
Figure 6:
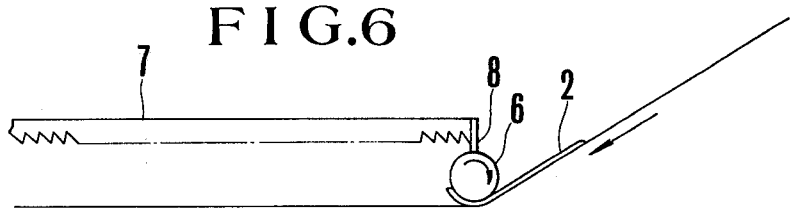
FIGS. 6 through 10 are views similar to FIG. 5 showing various stages of rolling the individual cookie sheet into a roll.

The rolling up of the end of the cookie on the roll-up roller 6 begins, as shown in FIG. 2, with an arcuate contact of the cookie material 2 with the roll-up roller 6 extending through an angle $\theta$. Since the roll-up roller 6 rotates at a slower speed than the movement of the surface 1a of the belt conveyor 1, it has a tendency to effect a production of forces acting on the cookie sheet material as indicated by the arrows shown in FIG. 3. The net effect is to bend the cookie material around the surface of the roll-up roller 6, as shown in FIG. 4.

Figure 7:
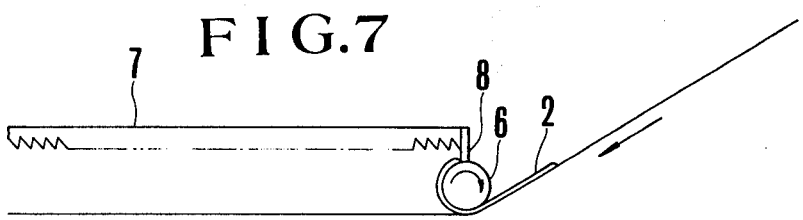
Figure 8:
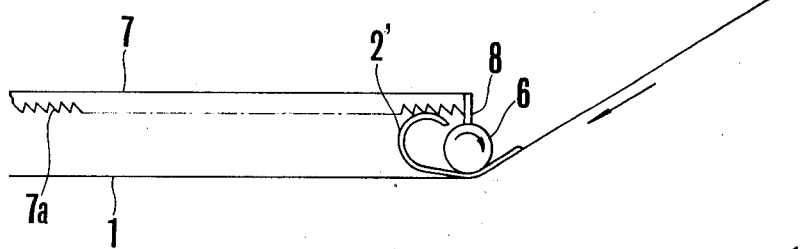
Figure 9:
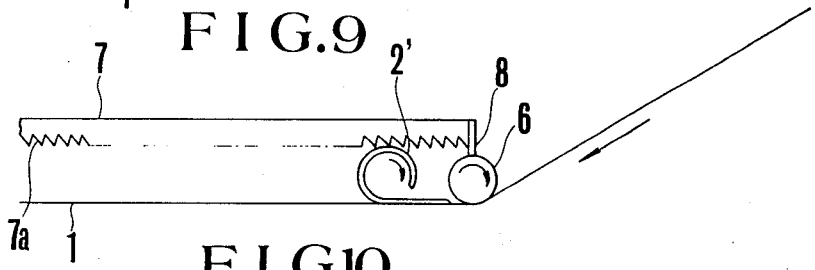
Figure 10:
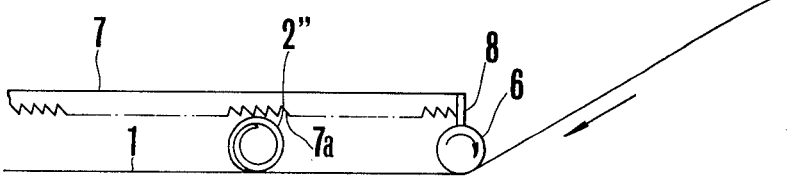

This same process is indicated on a smaller scale in FIGS. 5 to 10 and, after the cookie sheet material 2 reaches the location shown in FIG. 7, it contacts a stop member or deflector 8 which prevents further wrap around of the sheet material on roll-up roller 6. Since conveyor 1 continues to feed in the horizontal direction after it travels obliquely to the roller and around a portion of the surface thereof, the sheet material is pulled away as indicated in FIG. 8 to a point at which the outer surface of the partially wound cookie sheet material 2' engages against a roughened surface or friction surface 7a of a roll-up board 7. Friction surface 7a as indicated as being of saw-toothed construction, but it may be of any knurled or roughened surface to cause a holding action on the initially wound coil portion of the cookie sheet material so that the remaining portion will feed around beneath this coil and cause the continuous winding thereof as indicated in FIG. 9 in the direction of the small arrow shown near the cookie sheet material 2'. The rolling is substantially completed, as indicated in FIG. 10, due to the combined force action of the friction surface 7a which acts in a direction to the right hand of the drawing and the force action of the moving conveyor 1 which acts in a direction to the left hand of the drawing. The net effect is a turning couple acting evenly upon the sheet material to form it into a uniform roll, as shown at 2' in FIG. 1.

Figure 11:
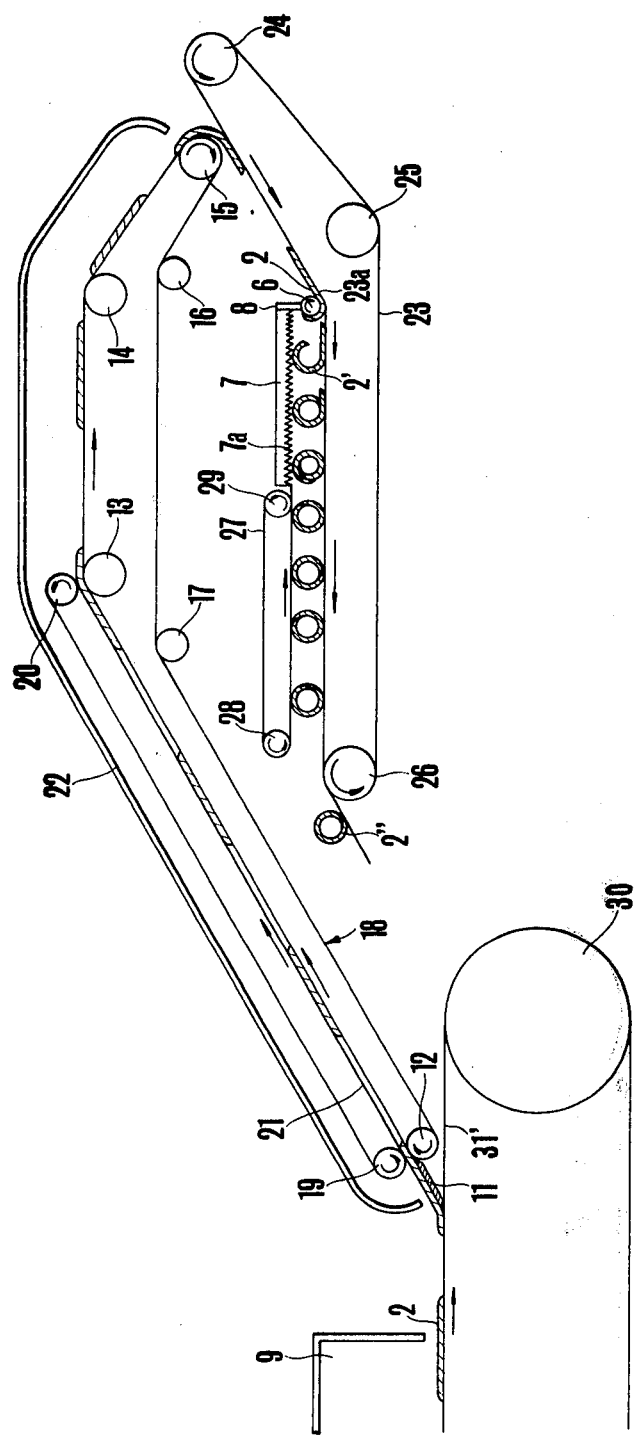
FIG. 11 is a view similar to FIG. 1 of another embodiment of the invention.

In the operation just described, the sheet of cookie material 2 is heated on its top surface in oven 9, and it is rolled up so that its heated or baked surface is positioned interiorly of the wound roll. The surface which is carried on the face of the belt which moves it through the conveyor becomes the outside surface of the rolled cookie. However, in some cases, it is desirable to roll up the sheet of cookie material with its baked surface outside and this may be accomplished in the embodiment of FIG. 11 merely with the use of cookie sheet reversing means which is effective to pick up each cookie sheet and to invert it before it is fed along the conveyor 1' which is similar to the conveyor 1 in the embodiment of FIG. 1. As shown in FIG. 11, the reversing means comprises a scraper member 11 arranged to engage over the top surface of a steel or meshed conveyor 31' used in association with the oven 9 to heat the cookie 2. The scraper plate 11 picks up each cookie and deflects it onto a reversing conveyor, generally designated 18, which is trained to run over pulleys 12, 13, 14, 15, 16 and 17. The reversing conveyor 18 cooperates with an auxiliary conveyor 21 which is located over an inclined portion of the reversing conveyor and engages over the surface of the heated cookies to prevent them from falling off and moves the cookies through a temperature control chamber 22. The temperature control chamber 22 includes a heating device (not shown) for keeping the cookies at a temperature at which they will be best adaptable to being formed into a roll and for preventing the cookies from hardening. The cookie sheet material 2 is then deposited one at a time onto a rolling up belt conveyor 23, which is similar to the belt conveyor 1 of the first embodiment. The cookies move around the reversing roller 15 and are deposited onto conveyor 23 with the heated face down so that when they are directed between this conveyor and the roll-up roller 6, they are wound in a direction in which the heated surface remains on the outside. The initial rolling operation is carried out with the rolling up board 7 and, in addition, this embodiment indicates a separate auxiliary conveyor 27 arranged relationship to the horizontal section of the conveyor 23 and it includes an endless belt which rotates over pulleys 28 and 29 so that its lower reach engages at the periphery of the rolls being formed and completes their formation. During this time, conveyor 27 is run at a slower speed than the conveyor 23 so that forces acting on the cookies being rolled will act in the directions of the opposed arrows shown in the drawing. The finished rolled cookie 2'' is then fed off the roller end 26. During the entire operation, it is advantageous to maintain the cookie sheet material at the proper temperature and humidity.

Figure 12:
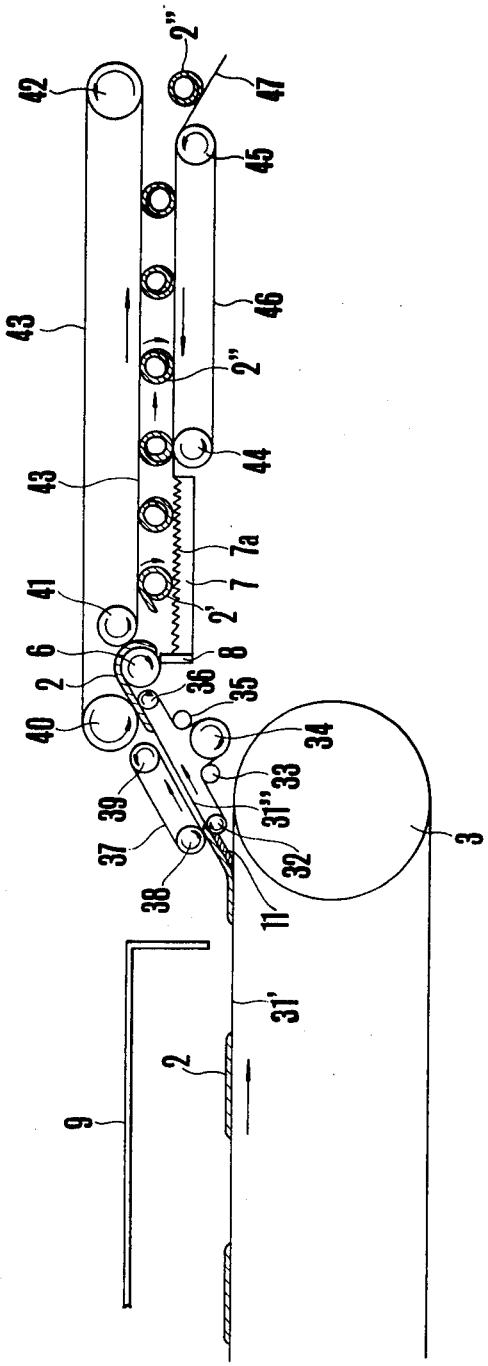
FIG. 12 is a view similar to FIG. 1 of still another embodiment of the invention.

In the embodiment of FIG. 12, a cookie is formed into a roll with the baked surface oriented outside, similar to the second embodiment. In this embodiment, however, the sheet of cookie material is not first reversed, but it is rolled in a downward direction over a roll-up roller 6 positioned below the feeding reach of an endless belt conveyor 3''. Belt conveyor 31'' includes an endless belt engaged over pulleys 32, 33, 34, 35 and 36. An auxiliary upwardly inclined belt conveyor 37 cooperates with the belt conveyor 31'' for preventing the fall off of the sheet material 2 and it includes end rollers or pulleys 38 and 39. A rolling up belt conveyor 43 which includes rollers 40, 41 and 42 is oriented so as to cooperate in deflecting cookie sheet material 2 around the roll-up roller 6 so as to initiate the formation of a roll in a downward direction with the baked side of the cookie outwardly. Once again, when the cookie end contacts the stopper 8, the cookie material is deflected away from the surface of the roll-up roller 6 and is advanced along the rolling up base 7 which is arranged opposite to the lower reach of the roll-up conveyor 43. The action of conveyor 43 and the rolling up board 7 continues the rotation of the cookie material to form the roll into a completed roll 2''. This rolling action is further carried out in cooperation with an auxiliary belt conveyor 46 which cooperates with the remaining portion of the roll-up conveyor 43 and it is spaced apart therefrom in a manner equivalent to the diameter of the rolled up cookie measured to the exterior surface thereof. The auxiliary belt conveyor includes rollers 44 and 45 and a feed-off portion 47 onto which the completed roll 2'' is delivered. At the end of the apparatus shown in FIG. 12, the cookie 2'' is conveyed to subsequent stages, such as, cooling and form-retaining stages along the downward feed chute 47.

While specific embodiments of the invention have been shown and described in detail to illustrate the application of the principles of the invention, it will be understood that the invention may be embodied otherwise without departing from such principles.

What is claimed is:

1. An apparatus for forming rolled sheet articles, such as cookies, which are rolled after heating, comprising an endless conveyor having a surface on which a sheet article thereon is continuously advanced at a predetermined speed, a roll-up roller rotatably mounted alongside a portion of said conveyor spaced less than the sheet article thickness therefrom and being rotated at a slower speed than said surface so as to engage the sheet article and cause the bending of the article around the surface of the roll-up roller, stopper means overlying said roll-up roller surface at a location spaced from the sheet article material contact on the surface of said roll-up roller to cause the sheet article material to be discharged from said roll-up roller, and sheet article rotation means engageable with respective opposite sides of said roller and effective to move the opposite sides at distinct speeds so as to produce a rotational couple thereon to continue the rolling up of the sheet article material.

2. An apparatus according to claim 1, wherein said sheet article rotation means includes a portion of said endless conveyor extending away from said roll-up roller and a fixed roll-up board spaced from said portion of said conveyor by an amount sufficient to contact the periphery of the partially rolled and completely rolled sheet material being advanced on said conveyor.

3. An apparatus according to claim 2, wherein said roll-up board has a surface opposed to the sheet material which frictionally engages said material.

4. An apparatus according to claim 3, wherein said stopper means includes a member arranged adjacent one end of said rolling up board overlying said roll-up roller and blocking the movement of the material around the surface of the roller.

5. An apparatus according to claim 1, wherein the article is a cookie sheet material and including an oven for heating the sheet material arranged adjacent said conveyor, conveyor means associated with said oven for moving the sheet material through said oven onto said conveyor.

6. An apparatus according to claim 5, wherein the oven heats the top side of the sheet material, said roll-up roller is located above said conveyor in a position to roll the heated top side of the material inwardly over the surface of said roll-up roller.

7. An apparatus according to claim 1, wherein said roll-up roller is located below said conveyor in a position such that the sheet material is fed downwardly over the surface of said roll-up roller and the top side of the sheet material becomes oriented outwardly in the wound roll.

8. An apparatus according to claim 1, wherein the sheet material is reversed before it is wound.

9. An apparatus according to claim 1, including an oven for heating the material, the material comprising a cookie sheet, means for advancing the cookie sheet into association with the oven, means for transferring the heated cookie sheet from the advancing means to said endless conveyor.

10. An apparatus according to claim 9, wherein said means for advancing said cookie sheet from said advancing means to said endless conveyor includes a reversing conveyor having a reach extending above the top of said endless conveyor and having a return roller overlying said endless conveyor, the cookie material being fed around said return roller and deposited on said endless conveyor with its initial top side being oriented downwardly on said endless conveyor.

11. A cookie forming device, comprising an oven, means for advancing cookie sheet material to said oven to heat the material, an endless conveyor arranged adjacent said advancing means in a position to receive the heated cookies and to move them through a feed path, said endless conveyor including a downwardly extending oblique portion and a horizontally extending portion, the roll-up roller located at the juncture of said horizontal and said downwardly extending oblique portion of said conveyor and being spaced close to said conveyor less than the thickness of the sheet material, said roll-up roller being rotatable at a speed which is less than the speed of advance of said endless conveyor and being engageable with each sheet of cookie materials to deflect it in a curve around said roller surface so as to begin the rolling thereof, a stopper overlying said roll-up roller deflecting the sheet material away from said roller as said sheet material is continuously fed by said conveyor from said oblique portion along said horizontal portion, and a friction surface spaced from said horizontal portion by an amount of the initial rolling of said sheet material and retarding the outward rolled end thereof while the material is advanced on said horizontal portion of said conveyor so as to complete the rolling of the material.

12. A cookie forming device, according to claim 11, wherein said friction surface comprises a moving surface.

13. A cookie forming device, according to claim 11, including means for reversing said cookies so that the portion thereof which is upward during its passage through said oven is oriented downwardly on said endless conveyor.

14. A cookie forming device, according to claim 11, wherein said roll-up roller is located below the surface of said endless conveyor and said sheet material is fed down over said surface so as to roll the sheet material with its top surface oriented outwardly.

* * * * *